United States Patent [19]
Horvei

[11] Patent Number: 5,224,829
[45] Date of Patent: Jul. 6, 1993

[54] ROTATABLE VALVE HAVING UPPER AND LOWER PARTS

[75] Inventor: Knut V. Horvei, Sandnes, Norway

[73] Assignee: Den Norske Stats Oljeselskap A.S., Stavanger, Norway

[21] Appl. No.: 743,353

[22] PCT Filed: Feb. 7, 1990

[86] PCT No.: PCT/NO90/00031

§ 371 Date: Aug. 8, 1991

§ 102(e) Date: Aug. 8, 1991

[87] PCT Pub. No.: WO90/09538

PCT Pub. Date: Aug. 23, 1990

[30] Foreign Application Priority Data

Feb. 10, 1989 [NO] Norway ............ 890570

[51] Int. Cl.5 .......... F16K 43/00; F16K 5/06; F16K 5/10
[52] U.S. Cl. .............. 137/315; 137/614.17; 251/58; 251/208; 251/249.5; 251/315; 251/316
[58] Field of Search ........ 137/315, 637, 637.2, 137/637.3, 614.16, 614.17, 614.18, 454.6; 251/58, 208, 249.5, 292, 304, 309, 314, 315, 316

[56] References Cited

U.S. PATENT DOCUMENTS

| | | | |
|---|---|---|---|
| 1,029,354 | 6/1912 | Forsman | 137/614.17 |
| 3,630,484 | 12/1971 | Taylor | 251/208 |
| 3,656,501 | 4/1972 | Buchta | 137/315 |
| 3,700,003 | 10/1972 | Smith | 137/614.17 |
| 3,707,161 | 12/1972 | Crawford | 137/614.17 |
| 3,860,032 | 1/1975 | Rogers | 137/614.17 |
| 4,187,872 | 2/1980 | Freeman et al. | 137/454.6 |
| 4,304,261 | 12/1981 | Forester | 251/249.5 |
| 4,432,387 | 2/1984 | Sims | 251/249.5 |
| 4,440,382 | 4/1984 | Pruvot et al. | 251/208 |
| 4,606,368 | 8/1986 | McCafferty | 137/454.6 |
| 4,727,901 | 3/1988 | Horvei | 137/318 |
| 4,901,752 | 2/1990 | Horvei | 137/315 |
| 4,901,977 | 2/1990 | Hendrick | 251/249.5 |
| 4,917,141 | 4/1990 | Brunel et al. | 137/454.6 |
| 4,961,444 | 10/1990 | Morgan et al. | 137/315 |

Primary Examiner—George L. Walton
Attorney, Agent, or Firm—Foley & Lardner

[57] ABSTRACT

A valve apparatus, in particular a rotatable valve comprising an upper part (10) and a lower part (6) which are demountably attached to each other. The valve's lower part (6) is mainly U-formed with sealing surfaces (17,18) arranged on the outwardly facing side faces, which sealing surfaces, in the case of closed valve bear against at least one valve seat on the valve housing's inlet and/or outlet end, and upper part's (10) external face is designed for totally or partly supporting bearing against lower part's (6) internal face and comprising a passage (34) designed to accommodate equipment, for example controlling or metering instruments in the upper part (10) can, in the case of closed valve, be lifted out of the valve housing (1) for maintenance.

9 Claims, 7 Drawing Sheets

ROTATABLE VALVE HAVING UPPER AND LOWER PARTS

TECHNICAL FIELD

This invention concerns a device associated with a valve, in particular a rotatable valve comprising an upper part and a lower part which are detachably joined to each other.

BACKGROUND ART

Valves of the kind mentioned above can be made sufficiently large and robust in order to be mounted onto pipelines which transport hydrocarbons, particularly subsea pipelines, but the invention can also be exploited in other environments and in smaller dimensions.

In the Norwegian patent application No. 860923, a ball valve is disclosed which is intended for connection with a pipeline system which conveys gas and/or oil at considerable sea depths. The valve can be demounted in a submerged state for instance for inspection or repair. Replacement of the internal vital parts can take place without any kind of extra cover and without the fluid in the pipeline leaking out during demounting, or without water from the surrounding environment being able to penetrate into the pipeline. This is achieved in that the rotatable member of the known valve comprises an upper part and a lower part. The upper part, which can be demounted from the valve housing, comprises, amongst other parts, the main packings of the valve. The lower part contains two displaceable sleeves which, when the valve can be demounted from the valve housing, comprises, amongst other parts, the main packings and two displaceable sleeves which, when the valve is open, are displaced outwards to engage with bearings in the valve housing, thereby forming a leak-proof, continuous fluid passageway.

In pipeline systems there is often a need for devices which can regulate the fluid flow and likewise there is a need for the mounting of metering equipment for instance for volumetric metering of fluid flows.

Apparatus of the above-mentioned kind which are placed in a fluid flow, are subjected to considerable wear and tear and demand relatively frequent, periodical maintenance. It is desirable that maintenance can be performed quickly and that it should not be necessary to depressurize the pipeline. It is also desirable that medium from the pipeline will not leak out into the surrounding environment when maintenance takes place.

SUMMARY OF INVENTION

This is achieved by a valve according to the present invention which is characterized in that the lower part of the rotatable member is predominantly U-shaped with sealing surfaces arranged on the outwardly facing side-faces, which sealing surfaces are, in the case of a closed valve, engaged with the valve housing's valve seats on respectively the inlet and/or outlet end, in that the upper part's external surface is designed for totally or partly resting support against the lower part's internal surface and comprises a through-flow passage (24) intended for accommodating controlling or metering equipment, in that the upper part, in the case of closed valve, can be withdrawn from the valve housing for maintenance.

BRIEF DESCRIPTION OF DRAWINGS

The invention will be more closely described in the following, making reference to the accompanying drawings in which.

DETAILED DESCRIPTION OF THE PREFERRED EMBODIMENT

Figure 1:
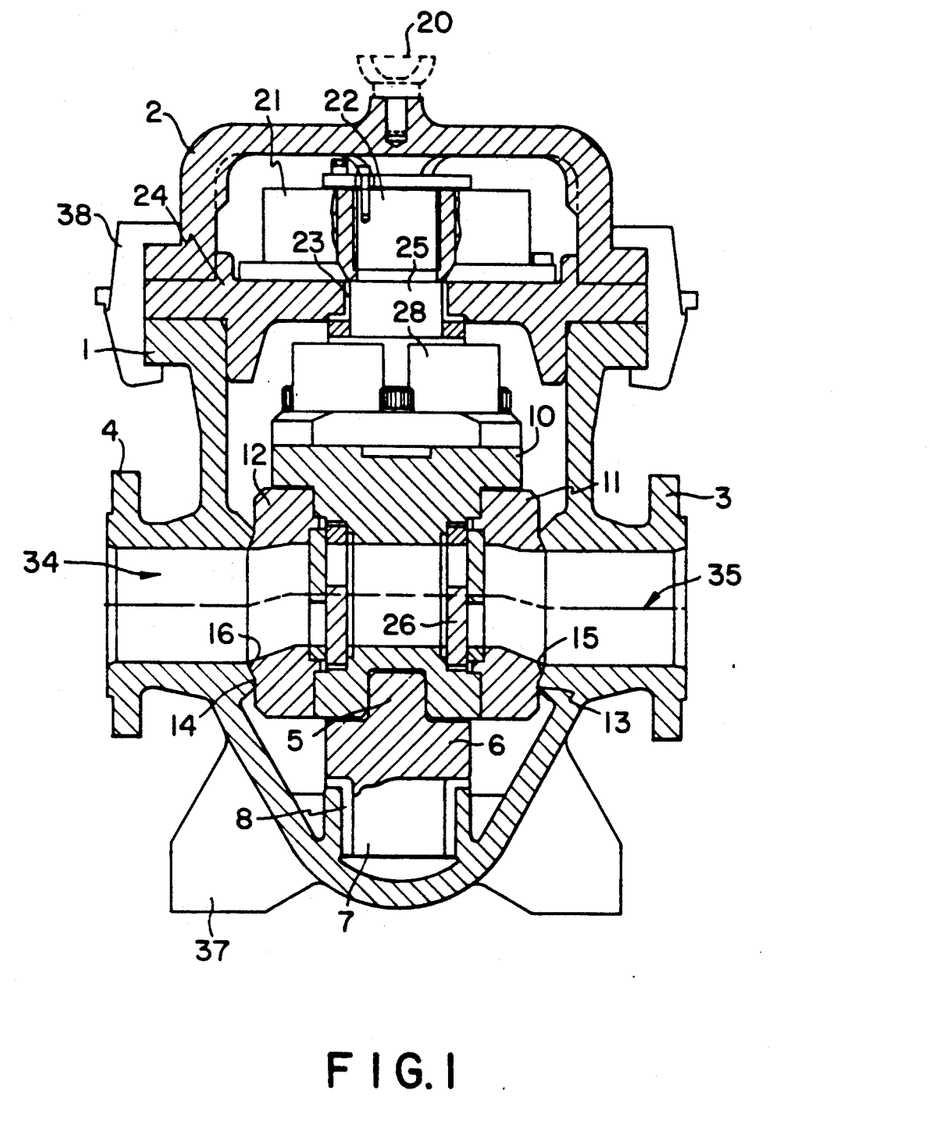
FIG. 1 shows a vertical section through a valve according to the invention when the valve is in an open position or an adjustable position.
Figure 2:
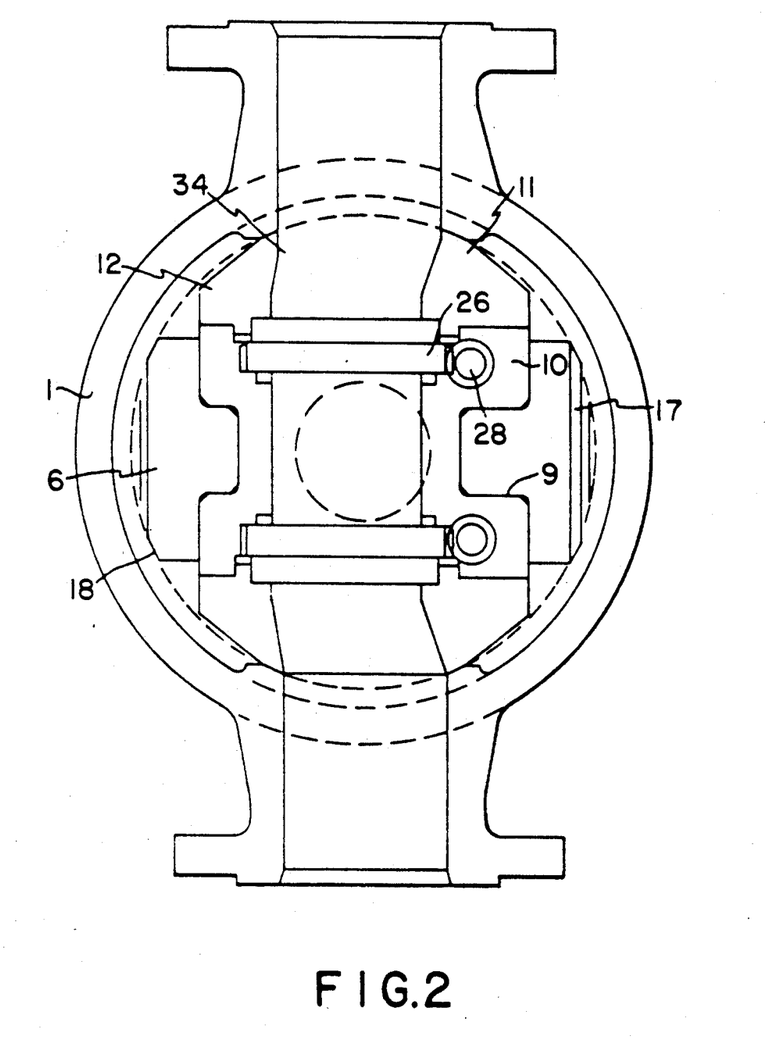
FIG. 2 shows a horizontal section through the valve shown in FIG. 1.

The constructive design of the valve will be described in detail with reference to the FIGS. 1-3. The valve comprises a valve housing 1 with a cover 2 which encompasses the upper parts of the valve. The cover is secured to the valve housing by means of locking segments 38. The valve housing comprises further an inlet flange 3 and an outlet flange 4 which connect to a pipeline (not shown) in a known manner. A duct for the fluid flow extends through the valve. In a practical embodiment there are supporting ribs 37 arranged on the lower side of the valve housing 1. On the under side of the valve housing 1, an internal bonnet 24 is placed between the valve housing 1 and the cover 2.

The rotatable component of the valve includes a U-shaped lower part 6 which by way of a journal 7 arranged on a lower side thereof is rotatably mounted in a bearing 8 arranged in a lower part of the valve housing 1. An upper part 10 is designed to be supportably placed against the internal portion of the lower part 6. In order to achieve a firm and stable support between the upper and lower parts, lower part 6 comprises a rib 5 which engages with a groove 9 (FIG. 5) in upper part 10.

Upper part 10 comprises a through-flow passage 34. In the area of the passage's 34 respective inlet and outlet, the upper part 10 is provided with sealing elements 11, 12, which in the shown embodiment are bolted to upper part 10. The sealing elements comprise conical sealing surfaces 13, 14 which engage with correspondingly designed valve seats 15, 16 on the valve housing 1. Lower part 6 comprises correspondingly designed spherical sealing surfaces 17, 18 which, with the rotatable member in the operating position, as most clearly shown in FIG. 2, face perpendicularly in relation to the upper part's sealing surfaces 13, 14. The rotating member's turn shaft 25 is pivotally mounted in a check bearing 23 in the internal bonnet 24. The valve's rotatable member can rotate from an open position as shown in FIG. 1, where the upper part's sealing faces bear against the valve seats 15, 16, to a closed position as shown in FIG. 3 where the lower part's sealing faces bear against the valve seats 15, 16 by rotating the whole rotating member 90°. When the valve is in a closed position, the lower part stops the fluid flow through the valve at both the inlet end and the outlet end.

For rotation of the rotating member, a hydraulic actuator 21 which acts on a turn shaft 22 is arranged. The turn shaft 22 is rigidly connected with the rotating member's turn shaft 25. The upper portion of the turn shaft 22 comprises splines 25 which engage with the hydraulic actuator 21.

Figure 3:
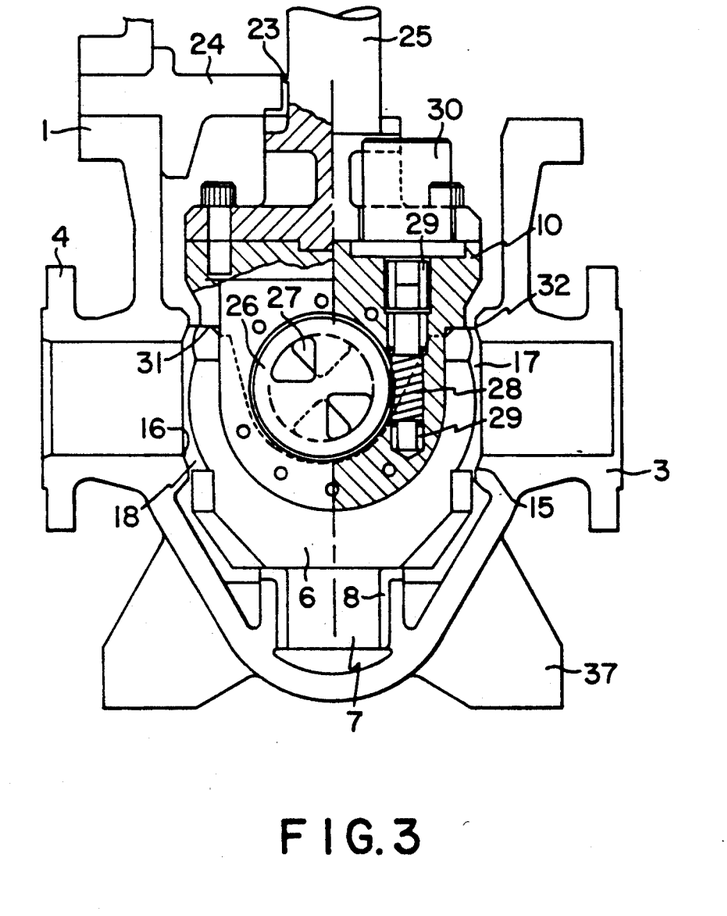
FIG. 3 shows a vertical section through the valve as in FIG. 1, but with the valve in its closed position.

Upper part 10 is designed to be able to receive various types of controlling or metering instruments. The object of such equipment can be:

regulation of flow velocity
recording of flow velocity
measuring of temperature
measuring of pressure
volumetric metering of fluid flow As an example of such equipment, in the shown embodiment which is most clearly disclosed in FIG. 3, a controlling mechanism 26 is arranged in the fluid flow passage 34 for regulation of the fluid flow. In the shown example, the regulating device 26 comprises rotatable discs 27 which can be displaced radially in relation to each other in order to close/open the fluid flow passage 34. In the case of a large drop in pressure across the valve, two regulating devices 26 can be used as indicated in FIG. 2. Rotation of the rotatable valve discs 27 is executed by means of a worm gear 28 which is directly connected to a gear ring on at least one of the valve discs 27. The worm gear is placed in a bore 29 in the upper part 10 and is actuated by a connection motor 30.

For a person skilled in the art it is evident that other equipment, for example metering or monitoring equipment, can also easily be accommodated in upper part 10.

With reference to the FIGS. 4-7, a closer description of the method for maintenance of the valve's vital parts and of equipment placed in upper part 10 will be provided.

The first step will be to close the valve by 90° rotation of the rotating member so that the spherical sealing surfaces 17, 18 of the lower part bear against the valve seats 15, 16 of the valve housing 1. The valve will now be closed at both the upstream and downstream ends.

The next step will be to equalize the pressure in the valve room with the ambient pressure before the cover 2 of the valve housing 1 is dismantled by releasing the locking segments 38. Upper part 10 and the associated equipment can now be lifted out of the valve housing 1 and be inspected/repaired.

Figure 4:
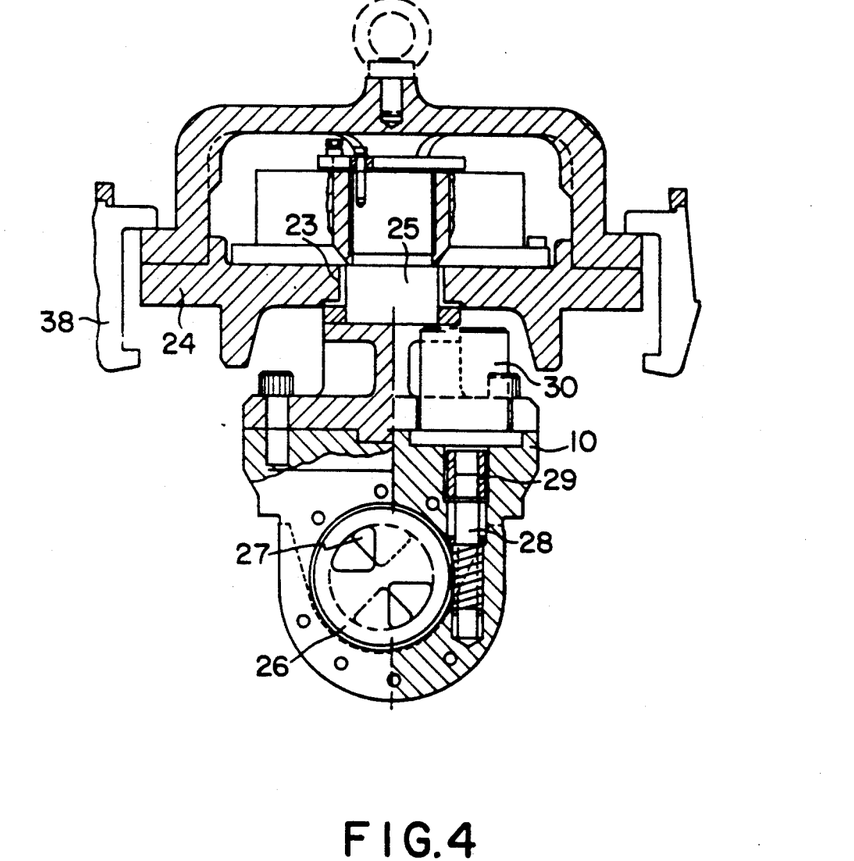
FIG. 4 shows a vertical section through upper part and components attached to this, after they have been lifted out of the valve chamber in connection with a maintenance operation.
Figure 5:
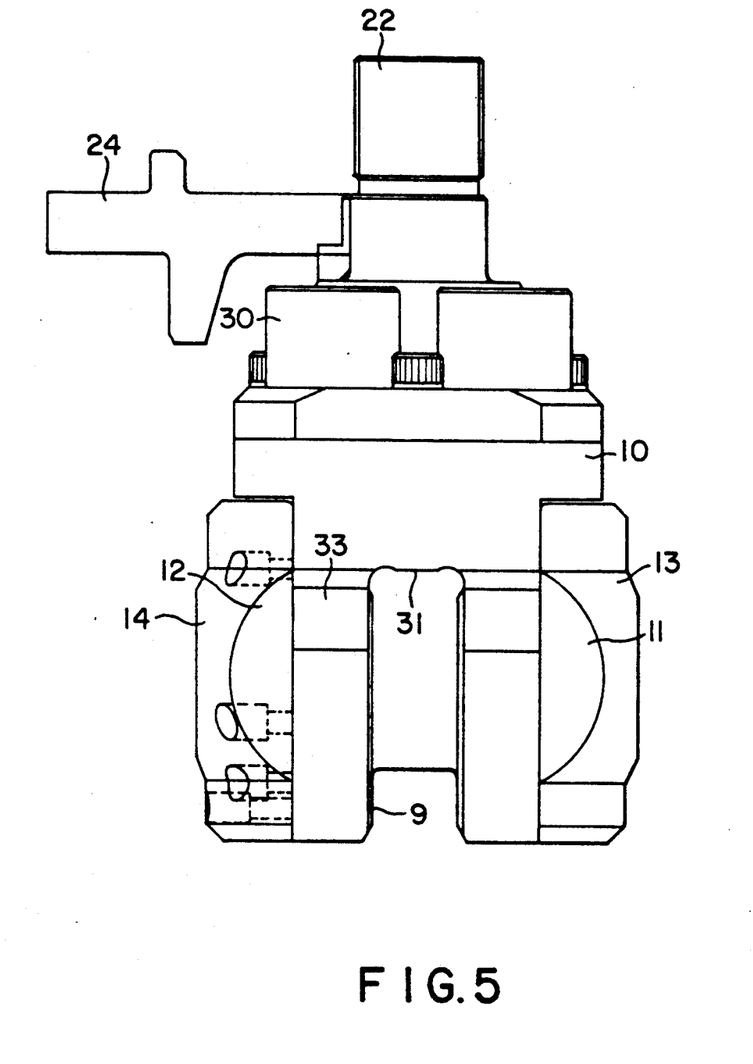
FIG. 5 shows a horizontal outline of upper part and associated components which are shown in FIG. 4.
Figure 6:
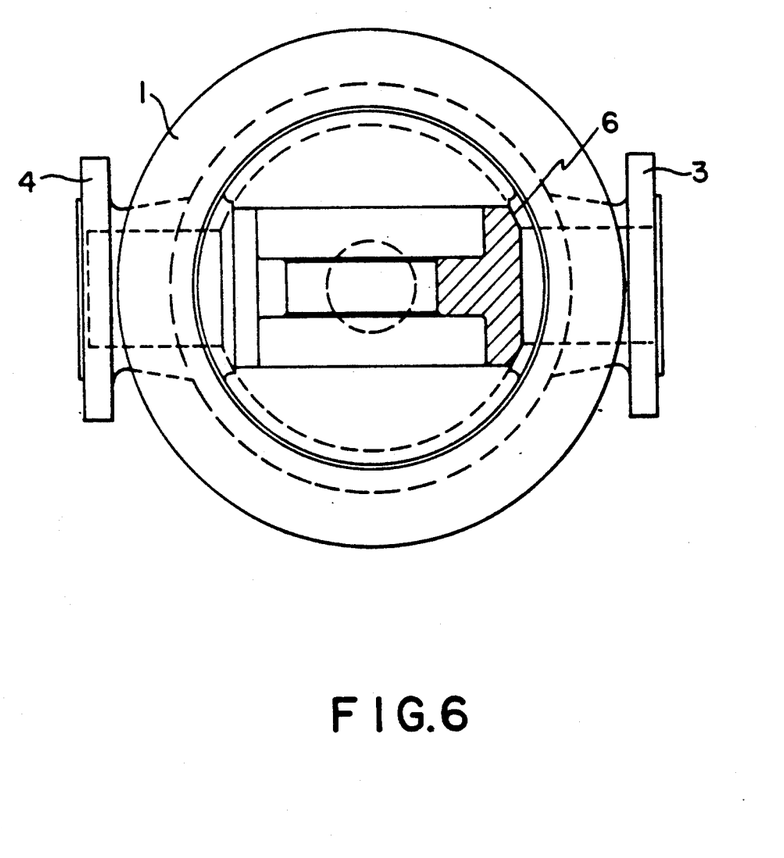
FIG. 6 shows a horizontal outline of the valve housing and lower part after the upper part has been lifted out.
Figure 7:
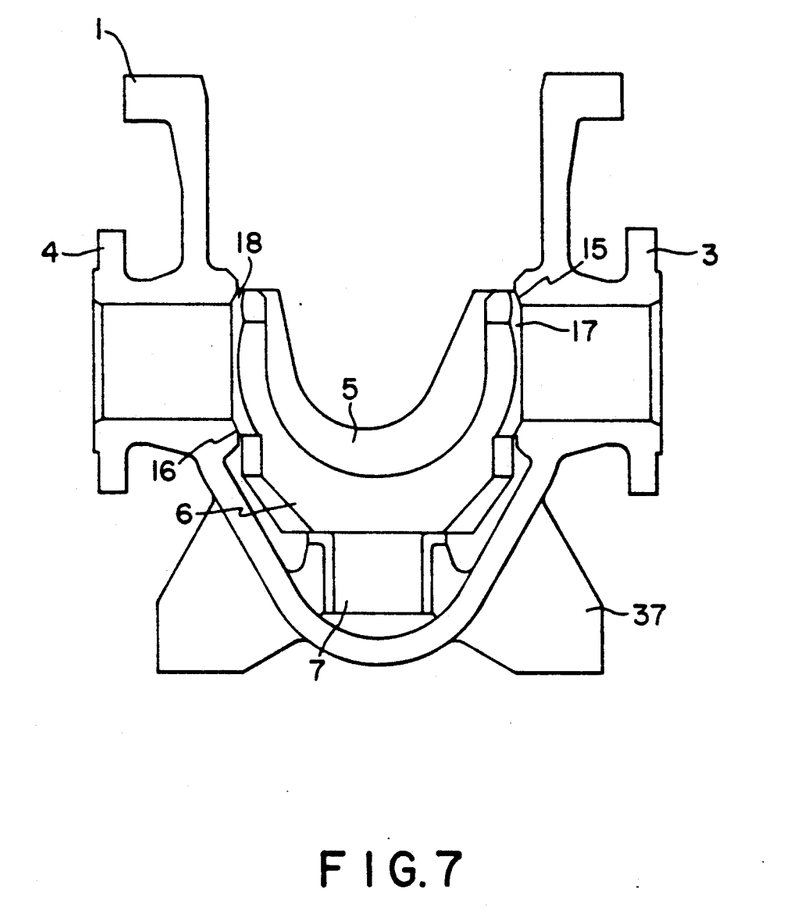
FIG. 7 shows a horizontal section through the valve housing and lower part which keeps the valve closed.

In a preferred embodiment, particularly when used in an underwater pipeline, upper part 10 and other components which are to undergo maintenance are attached to the underside of the cover 2. All components can now be lifted up to the surface via a hook 20 on the outside of the cover. The FIGS. 4 and 5 show the unit which is lifted to the surface for maintenance, while the FIGS. 6 and 7 show valve the housing and lower part which remain where they are.

The lower part 6 of the valve can preferably include an automatic locking mechanism (not shown) which keeps it in a locked position when upper part 10 is lifted up.

When the upper part with equipment is mounted after overhauling, or possibly when a new corresponding unit is mounted, the groove 9 must enter above the rib 5. The unit will halt in a lower position when a bearing edge 31 on the overhauled unit encounters the support 32 of the lower part. Bearing surfaces 33 on upper part will fasten the upper part for sideways position in relation to lower part. Before the cover 2 is fastened in a known way and the valve is rotated into open position, the valve room should be flushed.

We claim:

1. A rotatable valve comprising:
   (A) a valve housing having an inlet and an outlet formed therein and valve seats provided on the interior of said inlet and said outlet; and
   (B) a rotatable valve component which is positioned in said housing and which is rotatable from an opened position to a closed position, said rotatable valve component including
      (i) a lower valve part which is generally U-shaped and which has sealing faces formed on external side faces thereof; and
      (ii) an upper valve part which is insertable into said lower valve part and which is removable for maintenance, said upper part being at least partially supported on an internal surface of said lower part, said upper part having a passage formed therein which can accommodate additional fluid flow equipment;
   wherein when said rotatable valve component is rotated to said closed position said sealing faces seal against said valve seats and said lower valve part prevents communication between said inlet and said outlet, and when said rotatable valve component is rotated to said open position said sealing faces move away from said valve seats and a said lower part moves to allow communication between said inlet and said outlet via said passage.

2. The valve according to claim 1, wherein said upper part has sealing faces which bear against said seats of said valve housing when said valve is in said open position, thereby forming said passage.

3. The valve according to claim 1, wherein said lower part includes a journal which is arranged on an underside thereof and which is rotatably supported on said valve housing via a bearing.

4. The valve according to claim 1, wherein said upper part has sealing surfaces comprising sealing members having conically shaped sealing surfaces, and wherein said valve seats of said valve housing have shapes corresponding to those of said sealing members.

5. The valve according to claim 1, wherein said lower part includes a rib which fits into a groove formed in said upper part and maintains said upper and lower parts in fixed positions relative to one another.

6. The valve according to claim 1, wherein said housing includes an internal bonnet having a check bearing provided therein, and further comprising a hydraulic actuator and a turn shaft which has a lower end rigidly connected to said upper part and an upper, free end having splines which engage said hydraulic actuator.

7. A rotatable valve comprising:
   (A) a valve housing having an inlet and an outlet formed therein and valve seats provided on said inlet and said outlet; and
   (B) a rotatable valve component which is positioned in said housing and which is rotatable from an opened position to a closed position, said rotatable valve component including
      (i) a lower valve part which is generally U-shaped and which has sealing faces formed on external side faces thereof, (ii) an upper valve part which is insertable into said lower valve part and which is removable for maintenance, said upper part being at least partially supported on an internal surface of said lower part, said upper valve part having seals which seal against said valve seats when said valve is rotated to its open position and having a passage formed therein which can accommodate additional fluid flow equipment, and (iii) said additional fluid flow equipment including a controlling device, arranged in said passage of said upper part, for regulating fluid flow through said valve, said controlling device including rotatable discs which are radially displaceable in relation to each other;

wherein when said rotatable valve component is rotated to said closed position said sealing faces seal against said valve seats and said lower valve part prevents communication between said inlet and said outlet, and when said rotatable valve component is rotated to said open position said sealing faces move away from said valve seats and said lower part moves to allow communication between said inlet and said outlet via said passage.

8. The valve according to claim 7, wherein at least one of said discs has a gear rim provided thereon, and further comprising a worm gear which engages said gear rim.

9. The valve according to claim 8, further comprising a motor which is located in a bore formed in said upper part and which drives said worm gear.

* * * * *